Patented July 12, 1949

2,475,838

UNITED STATES PATENT OFFICE 2,475,838

TREATMENT OF FRUITS TO PREVENT BROWNING

Gestur Johnson, Fort Collins, Colo., and Dante G. Guadagni, Albany, Calif., assignors to United States of America as represented by the Secretary of Agriculture No Drawing. Application October 3, 1947, Serial No. 777,842

8 Claims. (Cl. 99—103)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the treatment of fruits; in particular it relates to the treatment of fruits such as apricots, nectarines, and peaches before freezing to prevent browning of the fruit when thawed for use.

It is well known in the art that fruits can be sulphited before freezing to prevent browning. This sulphiting technique, which involves dipping the fruit into an aqueous solution of sodium bisulphite or other soluble sulphite, or sulfurous acid, is effective but often gives the fruit an undesirable taste.

Another well-known technique involves treating the fruit with ascorbic acid. The amount of ascorbic acid required when used alone renders the process prohibitive from a standpoint of economy.

It has now been found that if the fruit is treated with a sulphiting agent, ascorbic acid, and an inorganic chloride, browning is prevented and the sulphiting agent and ascorbic acid are used in much smaller amounts than would be required of either alone to accomplish the same purpose. For instance, when fruits are treated by sulphiting alone, a concentration of at least 2,000 parts per million of $SO_2$ are required in the treatment bath. In the case of treatment with ascorbic acid alone, a concentration of at least 1% of ascorbic acid is needed in the treatment bath. We were surprised to discover that when the fruit is dipped into a bath containing sulphur dioxide (as sulphite or bisulphite), ascorbic acid and an inorganic chloride, these reagents exhibit a synergistic effect and the concentration of each can be reduced and good results obtained. Reducing concentrations of these reagents has several important results, namely, decrease in sulphur dioxide concentration gives better taste and decrease in amount of ascorbic acid results in lower cost of operation.

It is an object of this invention to provide a method for treating fruits, particularly peaches, nectarines, and apricots with a sulphiting agent, an inorganic chloride, and ascorbic acid.

Another object of this invention is to provide a process for preparing frozen fruits wherein the fruits, particularly peaches, nectarines, and apricots are treated with an inorganic chloride, ascorbic acid, and a sulphiting agent prior to freezing.

The following examples describe particular steps, conditions, and materials according to this invention but it is to be understood that these examples are submitted only by way of illustration and not limitation.

The abbreviation "P. P. M." used hereinafter means parts per million.

EXAMPLE 1

Elberta peaches were steamed for 45 seconds to 1 minute, dipped in cold water and slip-peeled. The peeled peaches were then sliced into twelfths. The slices were then dipped in an aqueous solution containing 1% salt (NaCl), 0.5% ascorbic acid, and 500 P. P. M. sulphur dioxide (added as sodium bisulphite), held in the bath for 2 minutes, then drained, packaged, and frozen at $-10°$ F.

After storing for about 2 to 3 months under refrigeration, the packages were opened and the contents allowed to stand in the open. The color of the fruit was observed and the following results noted:

| Time (Time elapsed after opening package) | Color |
|---|---|
| 5 hrs | Very bright color, no browning. |
| 6 hrs | Do. |
| 7 hrs | Good color, no browning. |
| 8 hrs | Good color, slight browning. |

EXAMPLE 2

The process set forth in Example 1 was repeated employing the same materials and conditions; however, the composition of the bath was as follows:

Sodium chloride _____per cent__ 1
Ascorbic acid _____do____ 0.5
$SO_2$ (added as $NaHSO_3$) _____P. P. M__ 300

After storing the frozen peaches for 2 to 3 months under refrigeration, the packages were opened and the contents set out in the open. The following observations were recorded:

| Time (Time elapsed after opening packages) | Color |
|---|---|
| 5 hrs | Very bright color, no browning. |
| 6 hrs | Do. |
| 7 hrs | Good color, no browning. |
| 8 hrs | Slight browning. |

EXAMPLE 3

The process set forth in Example 1 was repeated employing the same materials and conditions; however, the composition of the bath was as follows:

Sodium chloride _____ per cent__ 1
Ascorbic acid _____ do____ 0.4
$SO_2$ (added as $NaHSO_3$) _____ P. P. M__ 350

After storing the peaches for 2 to 3 months under refrigeration, the packages were opened and the contents set out in the open. The following observations were recorded:

| Time (Time elapsed after opening packages) | Color |
|---|---|
| 5 hrs | Very bright color, no browning. |
| 6 hrs | Do. |
| 7 hrs | Good color. |
| 8 hrs | Slight browning. |

Control experiment A

The following experiment does not illustrate the process of this invention and is included only to illustrate the unsatisfactory results obtained with sulphitation alone.

Elberta peaches were steamed for 45 seconds to 1 minute, dipped in cold water and slip-peeled. The peaches were then sliced into twelfths. The slices were divided into two batches. In batch A, the slices were dipped into an aqueous solution containing 500 P. P. M. $SO_2$ (added as $NaHSO_3$) and sufficient citric acid to give the solution a pH of 3. The slices were held in the bath for 2 minutes, drained, packaged, and frozen at —10° F. The slices of batch B were treated in the same manner as those of batch A but the bath contained 1,000 P. P. M. $SO_2$ and was adjusted to pH 3.0 with citric acid. It is to be noted that the citric acid is added merely to get better penetration of the $SO_2$ into the fruit.

After storing for 2 to 3 months under refrigeration, the packages were opened and the contents placed in the open air. The following results were observed:

| Time (Time elapsed after opening packages) | Color Batch A | Color Batch B |
|---|---|---|
| 3 hrs | Moderately dark | Slightly dark. |
| 4 hrs | Moderate browing | Slight browning. |
| 5 hrs | Severe browning | Moderate browning. |

Control experiment B

The following experiment does not illustrate the process of this invention and is included only to show the unsatisfactory results obtained with the use of ascorbic acid and salt.

Elberta peaches were steamed for 45 seconds to 1 minute, dipped in cold water and slip-peeled. The peaches were sliced into twelfths. One batch of slices (A) was dipped into an aqueous solution containing 2% sodium chloride and 1% ascorbc acid, held in the bath 2 minutes, drained, packaged, and frozen at —10° F. The slices of batch B were treated in the same manner except that the bath contained 1.5% sodium chloride and .75% ascorbic acid.

After storing for 2 to 3 months under refrigeration, the packages were opened and the contents placed in the open air. The following results were obtained:

| Time (Time elapsed after opening packages) | Color Batch A | Color Batch B |
|---|---|---|
| 5 hrs | Good bright color | Good bright color. |
| 6 hrs | Good color | Moderate browning. |
| 7 hrs | Slight browning | Severe browning. |
| 8 hrs | Moderate browning | Do. |

EXAMPLE 4

Blenheim apricots were washed, halved, pitted, steamed for 45 seconds to 1 minute, and dipped into cold water containing 1% sodium chloride. The apricots were then immersed in an aqueous solution containing 0.5% ascorbic acid and 1,000 P. P. M. $SO_2$ (added as $NaHSO_3$), held in the bath for 2 minutes, drained, packaged, and frozen at —10° F.

After storing for 2 to 3 months under refrigeration, the packages were opened and the contents set out in the open. The following results were observed:

| Time (Time elapsed after opening packages) | Color |
|---|---|
| 4 hrs | Bright color, no browning. |
| 5 hrs | Do. |
| 6½ hrs | Good color, no browning. |
| 7½ hrs | Slight to moderate browning. |

In control experiments, it was found that to obtain approximately equal results with sulphitation only, the bath had to contain at least 4,000 P. P. M. $SO_2$.

In control experiments, it was found that to obtain approximately equal results with only ascorbic acid and sodium chloride, the bath had to contain 1% ascorbic acid and 2% sodium chloride. The product produced thereby was somewhat salty in taste.

As previously set forth the essence of this invention involves the treatment of the fruit with ascorbic acid, an inorganic chloride, and a sulphiting agent in aqueous solution. For convenience, it is preferable to dissolve all three treating agents in a single solution. It is, of course, possible to make up three solutions, each containing one of the agents, and dipping the fruit in each solution. Other combinations are possible, for instance, the fruit may be placed in a dilute inorganic chloride solution to prevent oxidation while the batch is being treated. In such case the treating bath need contain only the ascorbic acid and the sulphiting agent. As the inorganic chloride, common salt (sodium chloride) is preferred, although other non-toxic, water-soluble inorganic chlorides such as potassium chloride, ammonium chloride, calcium chloride, or magnesium chloride may be used. The concentration of inorganic chloride should be from about 1% to about 2%, preferably 1% to 1.5%. The concentration of ascorbic acid (also known as vitamin C) should be at least about 0.4%. Higher amounts may be used but are not suitable from an economical standpoint. We prefer to use 0.4% to 0.5%. To supply the $SO_2$ in the aqueous bath, any sulphiting agent can be used, such as sulphurous acid, sodium sulphite, sodium bisulphite, potassium sulphite, potassium bisulphite, etc. Any soluble, non-toxic, inorganic sulphite or bisulphite can be employed. The amount of sulphiting agent, calculated as $SO_2$ should be from about 300 to 1,000 P. P. M. In the case of peaches, 300 to 500 P. P. M. give good results. In the case of apricots, 800 to 1,000 P. P. M. give good results.

Having described our invention, we claim:

1. The process of treating a fruit selected from the group consisting of peaches, nectarines, and apricots which comprises dipping the fruit in an aqueous solution containing about 1% to about 2% of an inorganic chloride, about 0.4 to about 0.5% ascorbic acid, and a sulphiting agent in a concentration calculated as $SO_2$ from about 300 to about 1,000 P. P. M.

2. The process of treating a fruit selected from the group consisting of peaches, nectarines, and apricots which comprises dipping the fruit in an aqueous solution containing about 1% to about 2% sodium chloride, about 0.4% to about 0.5% ascorbic acid, and a sulphiting agent in a concentration calculated as $SO_2$ from about 300 to about 1,000 P. P. M.

3. The process of treating peaches which comprises dipping the peaches in an aqueous solution containing about 1% to about 2% sodium chloride, about 0.4% to about 0.5% ascorbic acid, and a sulphiting agent in a concentration calculated as $SO_2$ from about 300 to about 500 P. P. M.

4. The process of treating apricots which comprises dipping the apricots in an aqueous solution containing about 1% to about 2% sodium chloride, about 0.4% to about 0.5% ascorbic acid, and a sulphiting agent in a concentration calculated as $SO_2$ from about 800 to about 1,000 P. P. M.

5. The process of preserving a fruit selected from the group consisting of peaches, nectarines, and apricots which comprises dipping the fruit, in divided condition, in an aqueous solution containing about 1% to about 2% of an inorganic chloride, about 0.4% to 0.5% ascorbic acid, and a sulphiting agent in a concentration calculated as $SO_2$ from about 300 to about 1,000 P. P. M., draining the dipped fruit then freezing it.

6. The process of preserving a fruit selected from the group consisting of peaches, nectarines, and apricots which comprises dipping the fruit, in divided condition, in an aqueous solution containing about 1% to about 2% sodium chloride, about 0.4% to 0.5% ascorbic acid, and a sulphiting agent in a concentration calculated as $SO_2$ from about 300 to about 1,000 P. P. M., draining the dipped fruit and then freezing it.

7. Process according to claim 4 wherein the fruit is peaches.

8. Process according to claim 4 wherein the fruit is apricots.

GESTUR JOHNSON.
DANTE G. GUADAGNI.

REFERENCES CITED

The following references are of record in the file of this patent:

UNITED STATES PATENTS

| Number | Name | Date |
| --- | --- | --- |
| 2,028,970 | Ewell | Jan. 28, 1936 |
| 2,298,933 | Elion | Oct. 13, 1942 |

OTHER REFERENCES

Bauerfeind et al.: "Methods of Freezing Sliced Apples with Ascorbic Acid"; reprint from the Fruit Products Journal and American Food Manufacturer.

Publication of Hoffman-La Roche Inc. Vitamin Division, Nutley 10, New Jersey, entitled "Processing Frozen Fruit with l-Ascorbic Acid (Vitamin C)," Revised Edition of February 1, 1946, page 1.

Publication of Hoffman-La Roche Inc. Vitamin Division, Nutley 10, New Jersey, entitled "Processing Frozen Peaches and Apricots with l-Ascorbic Acid (Vitamin C)," of May 14, 1945, pages 1 and 2.